US011667154B2

(12) United States Patent
Abdallah, Jr.

(10) Patent No.: US 11,667,154 B2
(45) Date of Patent: *Jun. 6, 2023

(54) LIGHT-WEIGHT INNER TUBE AND RELATED METHODS

(71) Applicant: Bridgestone Americas Tire Operations, LLC, Nashville, TN (US)

(72) Inventor: David G. Abdallah, Jr., Nolensville, TN (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 304 days.

This patent is subject to a terminal disclaimer.

(21) Appl. No.: 17/063,221

(22) Filed: Oct. 5, 2020

(65) Prior Publication Data

US 2021/0016604 A1 Jan. 21, 2021

Related U.S. Application Data

(63) Continuation of application No. 14/768,780, filed as application No. PCT/US2014/023577 on Mar. 11, 2014, now Pat. No. 10,792,956.

(60) Provisional application No. 61/792,294, filed on Mar. 15, 2013.

(51) Int. Cl.
| | |
|---|---|
| B60C 5/00 | (2006.01) |
| B60C 5/04 | (2006.01) |
| B60C 1/00 | (2006.01) |
| C09J 7/21 | (2018.01) |
| C09J 7/35 | (2018.01) |
| B29D 23/24 | (2006.01) |

(52) U.S. Cl.
CPC ............... *B60C 5/04* (2013.01); *B29D 23/24* (2013.01); *B60C 1/0008* (2013.01); *B60C 5/007* (2013.01); *C09J 7/21* (2018.01); *C09J 7/35* (2018.01)

(58) Field of Classification Search
CPC .................................................. B60C 5/007
See application file for complete search history.

(56) References Cited

U.S. PATENT DOCUMENTS

| | | | |
|---|---|---|---|
| 2,838,872 A | 6/1958 | Beck | |
| 3,608,603 A * | 9/1971 | Pfeiffer | B29C 66/1162 |
| | | | 152/511 |
| 5,576,373 A | 11/1996 | Kresge et al. | |
| 5,599,409 A * | 2/1997 | Benchea | B60B 21/08 |
| | | | 152/151 |
| 5,833,915 A | 11/1998 | Shah | |
| 5,900,088 A | 5/1999 | Yamagiwa | |
| 7,585,914 B2 | 9/2009 | Tsou et al. | |
| 7,611,395 B2 | 11/2009 | Bonsembiante | |
| 7,923,491 B2 | 4/2011 | Weng et al. | |
| 8,056,595 B2 | 11/2011 | Morooka | |

| | | | |
|---|---|---|---|
| 2001/0018492 A1* | 8/2001 | Watanabe | B60C 1/00 |
| | | | 525/50 |
| 2003/0019553 A1 | 1/2003 | Yun et al. | |
| 2005/0027058 A1 | 2/2005 | Dias et al. | |
| 2005/0076449 A1 | 4/2005 | Yuan | |
| 2006/0205547 A1 | 9/2006 | O'Neill et al. | |
| 2007/0125470 A1* | 6/2007 | VanCleave | B60C 5/10 |
| | | | 152/511 |
| 2008/0060735 A1* | 3/2008 | Taylor | B60C 5/10 |
| | | | 152/511 |
| 2008/0295940 A1 | 12/2008 | Tien | |
| 2008/0314491 A1 | 12/2008 | Soeda et al. | |
| 2009/0026834 A1 | 1/2009 | Kondo et al. | |
| 2009/0151841 A1 | 6/2009 | Jones et al. | |
| 2009/0218024 A1 | 9/2009 | Tsou et al. | |
| 2009/0288750 A1 | 11/2009 | Majumdar et al. | |
| 2010/0047586 A1 | 2/2010 | Morooka | |
| 2010/0112257 A1 | 5/2010 | Morooka | |
| 2010/0147432 A1 | 6/2010 | Morooka | |
| 2011/0030868 A1* | 2/2011 | Hamanaka | B60C 5/22 |
| | | | 152/519 |
| 2011/0041975 A1* | 2/2011 | Iizuka | B32B 1/08 |
| | | | 152/511 |
| 2011/0061782 A1* | 3/2011 | Merino Lopez | B60C 5/04 |
| | | | 152/503 |
| 2011/0226397 A1 | 9/2011 | Hamada | |
| 2011/0250372 A1 | 10/2011 | Weng et al. | |

(Continued)

FOREIGN PATENT DOCUMENTS

| | | |
|---|---|---|
| CN | 1176618 A | 3/1998 |
| CN | 101304873 A | 11/2008 |

(Continued)

OTHER PUBLICATIONS

Machine Translation: SU-1463512-A, Breiter Y U L (Year: 2023).*
Extended search report from EP application No. 14770178 (dated Sep. 12, 2016).
"Gas Barriers: A Basic Introduction Reference 2," XP002761702, from http://www.soarnol.com/eng/solution/solution040507.html, retrieved (by EPO) on Sep. 9, 2016, listed in extended EP search report as dated Dec. 31, 2012.
Choi, Hyun Goo, International Search Report with Written Opinion from PCT/US2014/023577, 12 pp, (dated Jul. 9, 2014).
Office action from Chinese application 201480014663.7 (dated Aug. 15, 2016).
"Tire, Wheel and Inner Tube Fit Standards" by Park Tool, dated Aug. 15, 2015, downloaded on Apr. 6, 2020 from https://www.parktool.com/blog/repair-help/tire-wheel-and-inner-tube-fit-standards, 7 pages total.

(Continued)

*Primary Examiner* — Kendra Ly
(74) *Attorney, Agent, or Firm* — Meredith E. Hooker; Jenny L. Sheaffer

(57) ABSTRACT

The present disclosure relates to a light-weight tire inner tube comprising a film tube with a wall thickness of 100 to 400 microns, pneumatic tires containing the light-weight tire inner tube, and related methods for manufacturing the light-weight tire inner tube. The film tube is comprised of a film material comprising at least one thermoplastic engineering resin and optionally at least one saturated elastomer, and the film material of the film tube has an oxygen permeability of 8-15 $cm^3$ $O_2/m^2$·per day at 25° C.

19 Claims, No Drawings

(56) References Cited

U.S. PATENT DOCUMENTS

| | | | |
|---|---|---|---|
| 2012/0118463 A1* | 5/2012 | Lesage | B60C 19/122 428/12 |
| 2012/0118465 A1 | 5/2012 | Majumdar | |
| 2012/0222795 A1 | 9/2012 | Majumdar et al. | |
| 2013/0157049 A1 | 6/2013 | Shannon et al. | |
| 2014/0166176 A1 | 6/2014 | Rodgers et al. | |

FOREIGN PATENT DOCUMENTS

| | | | |
|---|---|---|---|
| CN | 101370652 A | | 2/2009 |
| CN | 101735600 A | | 6/2010 |
| CN | 101959701 A | | 1/2011 |
| CN | 102015327 A | | 4/2011 |
| DE | 3729670 A1 | | 3/1988 |
| EP | 0260684 B1 | | 2/1990 |
| EP | 0376558 A1 | | 7/1990 |
| EP | 1905581 A1 | | 4/2008 |
| EP | 2344571 A1 | | 7/2011 |
| EP | 2420393 A1 | | 2/2012 |
| EP | 2423000 A1 | | 2/2012 |
| JP | 62-257830 A | | 11/1987 |
| JP | 05193305 A | | 8/1993 |
| JP | H05-193305 A | | 8/1993 |
| JP | 06-127205 A | | 5/1994 |
| JP | 2011-084143 A | | 4/2011 |
| SU | 1463512 A | * | 3/1989 |
| SU | 1463512 A1 | | 3/1989 |
| WO | 2005-044557 A1 | | 5/2005 |
| WO | 2007015278 A1 | | 2/2007 |
| WO | 2008004998 A1 | | 1/2008 |
| WO | 2009151859 A1 | | 12/2009 |
| WO | 2010016981 A1 | | 2/2010 |
| WO | 2012-106027 A1 | | 8/2012 |
| WO | 2012134454 A1 | | 10/2012 |

OTHER PUBLICATIONS

Third Office Action from Chinese application 201480014663.7 (dated Sep. 2017).

Response filed in EP application No. 14770178 (dated Mar. 28, 2017).

Second Office Action Chinese application 201480014663.7 (dated Apr. 5, 2017).

Ox-Tran Model 2/61 Oxygen Transmission Rate Test System, copyright 2001, by MOCON, Inc.

ExxcoreTM DVA publication by ExxonMobil Chemical, 2010.

Butyl Handbook, Section 3 Inner Tubes, compiled by H.E. Rooney, copyright 1966.

International Preliminary Report on Patentability from International application No. PCT/US2014/023577, dated Sep. 15, 2015.

International Search Report from International application No. PCT/US2014/023577, dated Jul. 9, 2014.

Press release from ExxonMobil entitled "ExxonMobil Chemical Completes Manufacturing Facility to Produce New Specialty Compounds for Energy Efficient Tires," dated Aug. 27, 2008.

Press release from ExxonMobil entitled "ExxonMobil Chemical Begins Commercial Product of Butyl Rubber Using a Proprietary New Breakthrough Technology," dated Jul. 31, 2007.

Press release from ExxonMobil entitled "ExxonMobil Chemical Company Announces Manufacturing Facility for New Specialty Compounds for Tires," dated Jun. 19, 2007.

Wikipedia article on High Frequency Welding from https://en.wikipedia.org/wiki/Plastic_welding#High_frequency_welding (accessed Oct. 21, 2015).

Wikipedia article on High Frequency Welding from https://en.wikipedia.org/wiki/Plastic_welding#High_frequency_welding (accessed Aug. 2012).

Inflatable 101, from www.specialinflatable.com/pages/101.html, copyright 2002-2010 (accessed Aug. 20, 2012).

Dielectrics—RF Welding, from www.dielectrics.com/RF-Welding.html, dated 2011 (accessed Aug. 20, 2012).

Machine translation of JP2011-084143 from Examiner in parent case.

Machine translation of JP06-127205 from Examiner in parent case.
Machine translation of JP62-257830 from Examiner in parent case.
Machine translation of SU-1463512A1 from Examiner in parent case.

* cited by examiner

LIGHT-WEIGHT INNER TUBE AND RELATED METHODS

CROSS REFERENCE TO RELATED APPLICATIONS

This application is a continuation of U.S. application Ser. No. 14/768,780 filed Aug. 19, 2015 and assigned U.S. Pat. No. 10,792,956, which claims priority to and benefit of PCT Application No. PCT/US2014/023577 filed Mar. 11, 2014 which claims priority to and any other benefit of U.S. Provisional Patent Application Ser. No. 61/792,294 filed Mar. 15, 2013, and entitled "Light-Weight Inner Tube And Related Methods," the entire disclosure of each of which is hereby incorporated by reference.

FIELD OF INVENTION

The present disclosure relates to a light-weight tire inner tube having reduced wall thickness while maintaining sufficient air impermeability for use as an inner tube, thereby allowing for lower overall weight of the inner tube as compared to existing tire inner tubes made of butyl rubbers. The present disclosure also relates to exemplary methods for manufacturing the light-weight tire inner tube.

BACKGROUND

Certain types of tires, including many tires for large vehicles such as buses, heavy trucks and tractors, utilize an inner tube within the tire. These inner tubes are generally torus-shaped and made from an impermeable or substantially impermeable material in order to prevent or at least minimize air leakage. The most common materials used for tire inner tubes are butyl rubbers, including halogenated butyl rubbers such as bromobutyl rubber and chlorobutyl rubber. Butyl rubbers are also commonly used to prepare tire innerliners. A tire innerliner is a flat sheet of material that is positioned at the inner most surface of a tubeless tire (i.e., a tire that does not utilize an inner tube); an innerliner functions to minimize air leakage from a tire. Unlike a tire innerliner which is fixed upon the inner surface of a tire, a tire inner tube is subject to a substantially different set of mechanical stresses and is generally made of a material that is not only substantially impermeable to air but is also flexible so as to allow it to adapt to the variety of mechanical stresses to which it is subject during operation of the tire.

SUMMARY OF THE INVENTION

The present disclosure relates to a light-weight tire inner tube comprising a film tube with a wall thickness of 100 to 400 microns and related methods for manufacturing the light-weight tire inner tube. The film tube is comprised of a film material comprising at least one thermoplastic engineering resin and optionally at least one saturated elastomer, and the film material of the film tube has an oxygen permeability of 8-15 cm$^3$O$_2$/m$^2$·per day at 25° C.

The first embodiment disclosed herein provides a light-weight inner tube for use inside a pneumatic tire, where the inner tube comprises a film tube with a wall thickness of 100 to 400 microns; and a stem operably sealed to the film tube. The film tube is comprised of a film material comprising at least one thermoplastic engineering resin and optionally at least one saturated elastomer, and the film material of the film tube has an oxygen permeability of 8-15 cm$^3$ O$_2$/m$^2$·per day at 25° C.

The second embodiment disclosed herein provides a pneumatic tire product comprising a tire; a light-weight inner tube with a wall thickness of 100 to 400 microns; and a stem operably attached to the film tube. The light-weight inner tube is located inside the tire; and the light-weight inner tube is comprised of a film material comprising at least one thermoplastic engineering resin and optionally at least one saturated elastomer, and the film material of the film tube has an oxygen permeability of 8-15 cm$^3$O$_2$/m$^2$·per day at 25° C.

The third embodiment disclosed herein provides a process for manufacturing a light-weight inner tube. The process comprises providing a tubular-shaped film material; cutting the material, thereby forming a tube segment having a first end and a second end; sealing the first end of the tube segment to the second end of the film tube segment thereby forming a contiguous tube. The process also includes operably attaching a stem to the tubular-shaped film material either after cutting the material or after forming the contiguous tube, thereby allowing inflation of the inner tube and forming of an inner tube. The tubular-shaped film material is comprised of at least one thermoplastic engineering resin and optionally at least one saturated elastomer, and the film-material has an oxygen permeability of 8-15 cm$^3$O$_2$/m$^2$·per day at 25° C.

DETAILED DESCRIPTION OF THE INVENTION

The present disclosure relates to a light-weight tire inner tube comprising a film tube with a wall thickness of 100 to 400 microns and related methods for manufacturing the light-weight tire inner tube. The film tube is comprised of a film material comprising at least one thermoplastic engineering resin and optionally at least one saturated elastomer, and the film material of the film tube has an oxygen permeability of 8-15 cm$^3$ O$_2$/m$^2$·per day at 25° C. By incorporating the relatively impermeable material into the tire inner tube, it is possible to achieve an equivalent (or even an improved) level of air retention while at the same time using less material (making the inner tube lighter overall) as compared to existing inner tubes made primarily of butyl or halobutyl rubber.

The first embodiment disclosed herein provides a light-weight inner tube for use inside a pneumatic tire, where the inner tube comprises a film tube with a wall thickness of 100 to 400 microns; and a stem operably sealed to the film tube. The film tube is comprised of a film material comprising at least one thermoplastic engineering resin and optionally at least one saturated elastomer, and the film material of the film tube has an oxygen permeability of 8-15 cm$^3$ O$_2$/m$^2$·per day at 25° C.

The second embodiment disclosed herein provides a pneumatic tire product comprising a tire; a light-weight inner tube with a wall thickness of 100 to 400 microns; and a stem operably attached to the film tube. The light-weight inner tube is located inside the tire; and the light-weight inner tube is comprised of a film material comprising at least one thermoplastic engineering resin and optionally at least one saturated elastomer, and the film material of the film tube has an oxygen permeability of 8-15 cm$^3$O$_2$/m$^2$·per day at 25° C.

The third embodiment disclosed herein provides a process for manufacturing a light-weight inner tube. The process comprises providing a tubular-shaped film material; cutting the material, thereby forming a tube segment having a first end and a second end; sealing the first end of the tube segment to the second end of the film tube segment thereby forming a contiguous tube. The process also includes operably attaching a stem to the tubular-shaped film material either after cutting the material or after forming the contiguous tube, thereby allowing inflation of the inner tube and forming of an inner tube. The tubular-shaped film material is comprised of at least one thermoplastic engineering resin and optionally at least one saturated elastomer, and the film-material has an oxygen permeability of 8-15 $cm^3 O_2/m^2$·per day at 25° C.

Materials

The film material used to prepare the inner tube can be comprised of various materials as long as the material or materials are capable of being extruded into the specified thickness (i.e., 100 to 400 microns) and meet the general requirement of having low permeability to air. As explained in more detail herein, the film material (or materials) used to prepare the inner tube is (are) used at a thickness of 100 to 400 microns and has (have) an oxygen permeability of 8-15 $cm^3$ $O_2/m^2$·per day at 25° C. at this thickness. In certain embodiments, the oxygen permeability of the film material (at a thickness of 100 to 400 microns) is 8-10 $cm^3$ $O_2/m^2$·per day at 25° C. As discussed in more detail below, various methods exist for measuring oxygen permeability, including commercially available equipment such as that available from Mocon, Inc. of Minneapolis, Minn., including, but not limited to their OXTRAN® brand of oxygen permeability testers (e.g., OXTRAN® Model 2/61). While inner tubes are usually filled with air rather than oxygen, the oxygen permeability test provides a suitable method for determining the overall permeability or impermeability of a given material.

In certain embodiments, the film material used to prepare the light-weight inner tube will have a Tg of above 150° C. Suitable materials for use in preparing the light-weight inner tube are known to those of skill in the art. In certain embodiments, the film material used to prepare the inner tube comprises at least one thermoplastic engineering resin and optionally at least one saturated elastomer. By the term saturated elastomer is meant an elastomer having 10% or less unsaturation, preferably 5% or less unsaturation. Non-limiting examples of saturated elastomers include hydrogenated diene rubbers, halogenated rubbers, butyl rubbers, silicone rubbers, sulfur-containing rubbers, fluoro-rubbers, hydrin rubbers, acryl rubbers, ionomers, and ethylene propylene diene monomer rubbers. In certain embodiments, the film material contains at least one saturated elastomer selected from the group consisting of hydrogenated diene rubbers, halogenated rubbers, butyl rubbers, silicone rubbers, sulfur-containing rubbers, fluoro-rubbers, hydrin rubbers, acryl rubbers, ionomers, ethylene propylene diene monomer rubbers and combinations thereof.

In yet other embodiments, the film material used to prepare the inner tube may constitute other materials such as ethylene-vinyl alcohol copolymers (commonly known as EVOH), modified ethylene-vinyl alcohol copolymers, vinylidene chloride polymers, nylon-containing elastomers, dynamically vulcanized alloys and combinations thereof. Commercial sources of these materials are well known to those of skill in the art. For example, a suitable EVOH for use in the film material of the inner tube is sold commercially by Kuraray Co., Ltd of Osaka, Japan under the trade name EVAL. The ethylene content of any EVOH utilized in the film material will preferably be less than 50 mole %, even more preferably between 25 and 50 mole %. Higher ethylene content EVOH copolymers (i.e., above 50 mole %) may have insufficient gas barrier properties and those with ethylene contents that are too low can lead to lower flexing resistance and deteriorated flexing resistance. Any EVOH utilized in the film material will also preferably have a relatively high amount of saponification (i.e., 90% or greater) as this also aids in gas barrier properties and leads to increased thermostability during forming. Modified ethylene-vinyl alcohol copolymer (or modified EVOH) is obtained by reacting an epoxy compound with an ethylene-vinyl alcohol copolymer. The modification can improve rupture properties of the copolymer and reduce the generation of cracks over time. Vinylidene chloride based polymers for use in the film material used to prepare the inner tube may be a copolymer of vinylidene chloride with one or more comonomers such as vinyl chloride, acrylonitrile, acrylates, methacrylates and acrylic acids. Exemplary materials are sold commercially under the trade name SARAN by Dow Chemical Company. In certain embodiments, the vinylidene chloride based polymers have 60-95% by weight vinylidene chloride content.

Dynamically Vulcanized Alloys

In certain embodiments, the film material used to prepare the inner tube is a dynamically vulcanized alloy (or a combination of dynamically vulcanized alloys). As used herein the term dynamically vulcanized alloy means a material made from a thermoplastic engineering resin and a copolymer of a halogenated isoolefin and a para-alkylstyrene by the process of dynamic vulcanization. Dynamic vulcanization is a process conducted at conditions that vulcanize fully or partially the elastomeric halogen-containing copolymer of the material. More generally the engineering resin and the rubber are mixed under high shear conditions and at elevated temperatures in the presence of a curing agent. This results in the rubber being both cross-linked and dispersed as fine particles (e.g., as a microgel) within the engineering resin as a continuous matrix. The composition that results is known as a dynamically vulcanized alloy, or DVA. The ingredients are mixed at or above the curing temperature of the rubber using equipment such as roll mills, Banbury® mixers, continuous mixers, kneaders or mixing extruders. The dynamically vulcanized alloy is unique in that although the rubber is cured, the composition can be processed and reprocessed by standard thermoplastic processing techniques such as extrusion, injection molding and compression molding and scrap can be salvaged and reprocessed. Further details concerning the process of dynamic vulcanization are contained in U.S. Patent Application Publication Nos. 2009/0312458 (entitled "Process for Preparing Dynamically Vulcanized Alloys"), 2009/218024 (entitled "Construction Comprising Tie Layer") and 2009/151841 (entitled "Construction Comprising Tie Layer"), and the disclosure of each is incorporated herein by reference.

Various thermoplastic engineering resins may be included in the film material that is used to prepare the inner tube, including polyamide resins and mixtures thereof as well as various nylon resins. Exemplary thermoplastic engineering resins include Nylon 6, Nylon 66, Nylon 6 66 copolymer, Nylon 11, Nylon 12 and mixtures thereof. The copolymer of halogenated isoolefin and a para-alkyl styrene may contain isoolefin copolymers with monomers such as isobutylene or isobutene, 2-methyl-1-butene, 3-methyl-1-butene, 2-methyl-2-butene, 1-butene, 2-butene, methyl vinyl ether, indene, vinyltrimethylsilane, hexane and 4-methyl-1-pentene. Exemplary isoolefin copolymers include multiolefins (e.g., $C_4$ to $C_{14}$ multiolefins such as isoprene, butadiene, 2,3-dimethyl-1-3,-butadiene, myrcene, 6,6-dimethyl-fulvene, hexadiene, cyclopentaidene and piperylene and other monomers disclosed in U.S. Pat. Nos. 5,506,316 and 5,162,425 (the disclosure of both patents and all other patents and patent applications mentioned herein is incorporated by reference). Suitable styrenic monomers in the isolefin copolymer can include styrene, methylstyrene, chlorostyrene, methoxystyrene, indene and indene derivatives and combinations thereof. The copolymer of halogenated isoolefin and a para-alkylstyrene can include random copolymers containing a $C_4$ to $C_7$ isoolefin (e.g., isobutylene) and a halomethylstyrene. The halogen of the halogenated isoolefin may comprise any halogen, preferably chlorine or bromine. Suitable copolymers for use in the film material of the inner tube include copolymers of isobutylene and p-methylstyrene that contain 0.5 to 20 mole % p-methylstyrene with up to 60 mole % of the methyl substituent groups on the benzene ring having a bromine or chlorine atom and acid or ester functionalized versions thereof with halogen displaced by maleic anhydride or acrylic or methacrylic acid functionality. Such interpolymers are known by the term halogenated poly (isobutylene-co-p-methylstyrene) or brominated poly (isobutylene-co-p-methylstyrene) and are commercially available under the tradename EXXPRO from ExxonMobil Chemical Company, Houston, Tex.

As mentioned above, in certain embodiments, the film material used to prepare the inner tube contains at least one thermoplastic engineering resin. Suitable thermoplastic engineering resins are known to those of skill in the art. Non-limiting examples of such thermoplastic engineering resins include polyamide resins (e.g., nylon 6, nylon 66, nylon 46, nylon 11, nylon 12, nylon 610, nylon 612, nylon 6/66 copolymer, nylon 6/66/610 copolymer, nylon MXD6, nylon 6T, nylon 6/6T copolymer, nylon 66/PP copolymer and nylon 66/PPS copolymer), polyester resins (e.g., polybutylene terephthalate, polyethylene terephthalate, polyethylene isophthalate, PET/PEI copolymer, polyacrylate, polybutylene naphthalate, liquid crystal polyester, polyoxyalkylene dimidate/polybutyrate terephthalate copolymer and other aromatic polyesters), polynitrile resins (e.g., polyacrylonitrile, polymethacrylonitrile, acrylonitrile/styrene copolymer, methacrylonitrile/styrene copolymer and methacrylonitrile/styrene/butadienecopolymer), polymethyacrylate resins (e.g., polymethyl methacrylate and polyethyl methacrylate), polyvinyl resins (e.g., vinyl acetate, polyvinyl alcohol, vinyl alcohol ethylene copolymer, polyvinylidene chloride, polyvinyl chloride, vinyl chloride/vinylidene chloride copolymer, vinylidene chloride/methacrylate copolymer, vinylidene chloride/acrylonitrile copolymer), cellulose resins (e.g., cellulose acetate and cellulose acetate butyrate), fluororesins (e.g., polyvinylidene fluoride, polyvinyl fluoride, polycholorofluoroethylene and tetrafluoroethylene/ethylene copolymer) and imide resins (e.g., aromatic polyimide). Combinations of these thermoplastic engineering resins may also be utilized in the film material used to prepare the light-weight inner tube. In certain embodiments, the film material contains at least one thermoplastic engineering resin selected from the group consisting of polyamide resins, polyester resins, polynitrile resins, polymethyacrylate resins, polyvinyl resins, cellulose resins, fluororesins, imide resins and combinations thereof Fillers In certain embodiments, the film material used to prepare the inner tube may contain one or more filler materials such as can aid in increasing the air impermeability of the film material. Suitable examples include various clays, talc, mica, coal dust, silica, calcium carbonate and/or most any low to non-reinforcing filler.

Preparation of the Film Material

In general, the film material used to prepare the inner tube can be prepared by standard mixing methods known to those of skill in the art. The methods and products disclosed herein are not particularly limited to any specific type of mixing or pre-mixing of ingredients contained within the film material used to prepare the inner tube. However, when a screw extruder is used to melt the components just prior to blow extrusion, it is preferred that all of the ingredients for the film material will have been mixed prior to being adding to the screw extruder that precedes the die. For example, when the film material used to prepare the inner tube comprises at least one thermoplastic engineering resin and at least one saturated elastomer, the components are preferably melt-mixed and suitable methods for dispersing the rubber particles into the thermoplastic engineering resin include use of a screw extruder, kneader, Banbury mixer, bi-axial kneader and extruder. The temperature utilized should be a temperature above that where the thermoplastic engineering resin melts. Mixing time will vary depending upon the type and number of ingredients and the mixing apparatus utilized but is generally from a few seconds to 10-15 minutes. The material can then be made into a film (having a thickness in the ranges previously described) by an extrusion process. As described in more detail below, in certain embodiments, the extruding comprises blowing or blow extrusion.

Forming a Film

When extruding polymers, raw material (often in the form of small beads) can be gravity fed from a top mounted hopper into the barrel of the extruder. Additives (in liquid or pellet form) may be mixed into the material prior to arriving at the hopper. The raw material enters through the feed throat (an opening near the throat of the barrel of the extruder) and comes into contact with a screw. The screw rotates (often very quickly such as at 100 rpm or more) and forces the raw material forward into the barrel of the extruder where it is heated to the desired melt temperature. In many processes, a heating profile is set for the barrel in which three or more independent controlled heater zones gradually increase the temperature from the rear (where the raw material enters) to the front. This allows for gradual melting and decreases the risk of overheating (which can lead to degradation). Heat is generated by the high pressure and friction that takes place in the barrel of the extruder. In certain instances, it may be possible to turn off any external heat source and rely upon the heat generated from the pressure and friction within the barrel. Cooling fans or other cooling methods (e.g., forced air cooling, cooling jacketing using water) may be used to maintain the temperature below a desired value if too much heat is generated within the barrel.

At the front of the extruder barrel, the molten polymer leaves the screw and travels through a screen pack that serves to remove contaminants from the melted material. Screens are often reinforced with metal breaker plates (a thick puck containing many holes) because the pressure within can be very high (5000 psi or more). The screen and breaker plate help create back pressure in the barrel. Back pressure is required to ensure uniform melting and mixing of the raw materials. The amount of pressure generated can be adjusted by varying the screen pack configuration. The combination of the screen pack and the breaker plate also help convert the rotational memory of the plastic into longitudinal memory.

After the molten material passes through the breaker plate it enters the die. The die gives the final product its profile (in this instance a tubular film) and is designed to allow the molten material to flow evenly from a cylindrical shape to the final shape. Uneven flow must be avoided as it will produce a product with variations and stresses at points in the profile.

In one or more embodiments disclosed herein, the film tube is formed by flow extruding the material via blow extrusion. In a blow extrusion process, the raw material is treated the same in the barrel of the extruder, but a special type of die is used. The die has the general appearance of an upright cylinder with a circular opening similar to a pipe die. The diameter can be a few centimeters to a few meters. The molten material is pulled upward from the die opening (such as by a pair of nip rolls above the die). Changing the speed by which the molten material is pulled upwards can change the thickness of the film. Around the die is an air-ring which acts to cool the film as it travels upward. In the center of the die is an air outlet from which compressed air is blown into the center of the extruded material creating a bubble-like or tube-like appearance.

In certain embodiments, an adhesive layer is co-extruded along with the film layer of polymer. This adhesive layer should be considered to be optional as it will not (in most circumstances) provide appreciable benefits to the film material in terms of oxygen or air impermeability. However, as discussed in more detail below, in certain embodiments, the adhesive layer may be used to advantage in sealing the ends of the tubular film material to form the continuous tube that forms the inner tube. When present, the thickness of the adhesive layer is between 10 and 50 microns, and in other embodiments 25 to 50 microns. The adhesive layer may be comprised of various materials, including but not limited to, at least one thermoplastic elastomer selected from the group consisting of block styrene-butadiene copolymers, epoxidized styrene-butadiene-styrene block copolymers, polybutadiene-isoprene block copolymers, polyamide-polyether copolymers, polystyrene-polyphenylene oxide copolymers, polyurethanes, polyolefins, polyamides, polyesters, and combinations thereof.

In certain embodiments, the adhesive layer contains up to 25 phr of one or more tackifiers. When amounts are mentioned herein (e.g., phr) they are intended to encompass both the amount of a substance present in the respective extruded layer of the inner tube and the amount used to prepare the respective layer (i.e., the amount used in a recipe). Generally speaking, tackifiers are substances that increase the stickiness or tack of the adhesive layer. Suitable tackifiers for use in the adhesive layer are known to those of skill in the art. Non-limiting examples of suitable tackifiers for use in the adhesive layers include phenolic resins, rosins, aliphatic hydrocarbon resins, aromatic hydrocarbon resins, aliphatic-aromatic resins, hydrogenated resins, dicyclopentadiene resins and poly(terpenes). In certain embodiments, the adhesive layer contains one or more tackifiers selected from the group consisting of phenolic resins, rosins, aliphatic hydrocarbon resins, aromatic hydrocarbon resins, aliphatic-aromatic resins, hydrogenated resins, dicyclopentadiene resins, poly(terpenes) and combinations thereof.

The adhesive layer may also optionally contain at least one cross-linking agent, at least one curative and/or at least one filler. In embodiments, various amounts of the cross linking agent, curative and/or filler may also be added to the components of the film layer, although this is not preferred (except for those fillers disclosed later that aid in increasing the air impermeability of the film layer). In certain embodiments one or both adhesive layers contain at least one cross-linking agent, curative or filler. Various cross-linking agents suitable for incorporation into the adhesive layers are known to those of skill in the art and include general rubber cross-linking agents (sometimes called vulcanization agents) which are often used in an amount of about 1 to 4 phr. For a general disclosure of suitable vulcanizing agents one can refer to Kirk-Othmer, Encyclopedia of Chemical Technology, 3rd ed., Wiley Interscience, N.Y. 1982, Vol. 20, pp. 365-468, particularly "Vulcanization Agents and Auxiliary Materials" pp. 390-402) the disclosure of which is herein incorporated by reference. Non-limiting examples of suitable vulcanization agents include, but are not limited to, sulfur in various forms such as powdered sulfur, precipitated sulfur, high dispersion sulfur, surface treated sulfur, insoluble sulfur, dimorpholine disulfide and alkylphenol disulfide. Likewise, various vulcanization accelerators suitable for use in the adhesive layer are known to those of skill in the art who will understand that a suitable vulcanization accelerator will be able to function at a relatively high temperature. Vulcanization accelerators are used at varying amounts including in amounts of about 0.5 to 2 phr. Non-limiting examples of suitable vulcanization accelerators include thiuram based (e.g., tetramethylthiuram disulfide, tetraethylthiuram disulfide, tetramethylthiuram monosulfide, dipentamethylenethiuram tetrasulfide, tetrabenzyl disulfide), dithio acid salt based (e.g., Zn-dimethyldithiocarbamate, Zn-diethyldithiocarbamate, Zn-di-n-butylthiocarbamate, Zn-ethylphenyldithiocarbamate, Te-diethyldithiocarbamate, Cu-dimethyldithiocarbamate, Fe-dimethyldithiocarbamate, pipecolinepipecolyldithiocarbamate), thiourea based (e.g., ethylene thiourea, diethyl thiourea), aldehyde ammonia based (e.g., hexamethylene tetramine), guanidine based (e.g., diphenyl guanidine), thiazole based (e.g., 2-mercaptobenzothiazole or its Zn salt, cyclohexylamine salt, dibenzothiazyldisulfide), and sulfonamide based (e.g., cyclohexylbenzothiazylsulfenamide, N-oxydiethylenebenzothiazyl-2-sulfenamide, N-t-butyl-w-benzothiazolesulfenamide, 2-(thymolpolynyldithio)benzthiazole).

As well, various fillers may be incorporated into the adhesive layer. Suitable fillers are known to those of skill in the art. Non-limiting examples of suitable fillers for incorporation into the adhesive layer include zinc oxide, clays, fatty acids (e.g., stearic acid, oleic acid), calcium carbonate, magnesium carbonate, talc and combinations thereof. Preferably, when a filler is incorporated into the adhesive layer it is a filler other than carbon black as carbon black does not incorporate well into most thermoplastic elastomers.

In certain embodiments, a partitioning sheet layer is co-extruded along with the film layer and the optional adhesive layer; in such embodiments, the partitioning sheet layer is the inner-most layer within the tubular-shaped film material. The partitioning sheet layer acts to prevent the innermost adhesive layer (when present) from sticking to itself during transportation of the tubular-shaped film material. In certain embodiments, it may also be useful to retain the partitioning sheet layer on the adhesive layer even during manufacture and use of the light-weight inner tube. Materials used in a partitioning sheet layer must also be capable of being extruded to form the partitioning sheet layer. Suitable materials for preparation of the partitioning sheet layer include saturated polymers and these materials are well known to those of skill in the art. Exemplary, non-limiting examples of suitable materials for use in the partitioning sheet layer include polyethylene, polypropylene and polybutene. When present, the partitioning sheet layer generally has a thickness of 50 to 500 microns and in other embodiments a thickness of 100 to 300 microns.

Generally, blow extrusion expands the cross-section of the extruded material by some multiple of the die diameter. The ratio is often referred to as the blow-up ratio. The nip rolls (when present) help to flatten the tube into a double layer of film with a width equal to ½ the circumference of the blown tube. (In embodiments where the adhesive layer is present and partitioning sheet layer is the inner-most layer, the presence of the partitioning sheet layer will prevent the collapsed adhesive sheet layer from sticking to itself, thereby facilitating opening of the "folded" or collapsed product and ultimately allowing for inflation of the inner tube once the ends of a segment of the tubular-shaped film material are sealed together. In those embodiments where no adhesive layer is present, there is generally no need for a partitioning sheet layer because the blown polymer material will not stick to itself after it has been cooled.)

An advantage of using blow extrusion (as compared to traditional film extrusion processes) is that blow extrusion does not result in edges where there may be quality (i.e., thickness) variations. After extruding, the formed product (i.e., the tubular-shaped film material) is usually cooled. Cooling is often achieved by pulling the extruded film through a water bath or for thinner films through a series of cooling rolls. After the extruded film has been cooled, it can be rolled onto a spool with the partitioning sheet layer facing inward. The rolled film may be stored and/or transported.

Forming the Inner Tube

One process for manufacturing a light-weight inner tube as disclosed herein is as follows. Modification of this process as well as other alternative processes for manufacture of the light-weight inner tube (especially with regard to sealing of the ends) may be utilized and should be considered to be within the scope of the present disclosure. In the exemplary process, a tubular-shaped film material is utilized. This tubular-shaped film material can comprise the extruded material described above (e.g., a material comprising at least one thermoplastic engineering resin and optionally at least one saturated elastomer, where the material has an oxygen permeability of 8-15 cm$^3$ O$_2$/m$^2$·per day at 25° C.). The tubular-shaped film material is cut at a desired length to form a film tube segment having a first end and a second end. Thereafter, the first end of the film tube segment is sealed to the second end of the film tube segment, thereby forming a contiguous tube. The sealing of the first and second ends may be performed in various ways, including, but not limited to, heat sealing, high-frequency welding, or combinations thereof. Furthermore, in those embodiments where the film material includes an adhesive layer, the first end and second end of the film tube segment may be either partially or entirely sealed by overlapping the adhesive portion of one end onto the polymer/non-adhesive portion of the other end. In other words, in those embodiments where the film material includes an adhesive layer, sealing of the first and second ends may take place either entirely by making use of the adhesive properties of the adhesive layer or by making use of the adhesive properties of the adhesive layer in combination with another sealing method (e.g., heat sealing, high frequency welding or chemical-based sealing). Generally, any type of sealing method that is utilized must be sufficient to not only provide an airtight seal, but must also provide a seal that can withstand the inflation pressure of the inner tube.

When heat sealing is utilized for sealing of the first and second ends, it should be understood that the particular temperature to which the first and second ends are heated (or alternatively, the temperature that is applied to those ends) will vary depending upon the material or materials used to prepare the contiguous tube. Generally, the temperature will be sufficient to raise the first and second ends to above the melt temperature of the material. As a non-limiting example, when the material used to prepare the contiguous tube is a dynamically vulcanized alloy comprising brominated copolymer of isobutylene and p-methylsytrene with nylon, the melt temperature of the material is 170-195° C. In certain embodiments, when heat sealing is utilized for sealing of the first and second ends, after the heat sealing is completed, an additional form of sealing is utilized (e.g., using an additional chemical compound over the sealed section of the first and second ends). In certain embodiments, the heat sealing or ultrasonic welding is performed in combination with adding a further form of sealing such as with a glue or resin over the sealed section of the first and second ends. Various types of glue and/or resin can be utilized, but not limited to, air-curable epoxies, heat-curable resins, UV-curable epoxies or resins.

When welding is utilized for sealing of the first and second ends, it should be understood that various forms of welding may be utilized. However, all such forms consist of generally of welding together the first and second ends through the application of some type of energy without the need for adding chemical compounds to create the welded seal. In certain embodiments, the type of welding is high-frequency welding, also known as radio frequency welding. High-frequency welding relies upon electro-magnetic energy to permanently bond (or seal) thermoplastic materials together. Unlike sealing methods that involve the use of a chemical substance to create the seal or bond, high-frequency welding has the advantage of not introducing any additional materials into the seal. Hence, a seal between the first and second ends that is formed by high-frequency welding can be described as "clean" because no additional chemical are required to produce the seal. High-frequency welding subjects the material to be sealed (i.e., the first and second ends of the tubular-shaped material) to radio frequency energy, thereby producing molecular agitation in the material causing it to melt and flow together. Generally some type of temporary clamping or clipping of the first and second ends will be desirable so as to hold the ends together while the welding process is taking place. As a non-limiting example, clamping the first and second ends together (under pressure) between electrodes will allow a magnetic field to be generated between the electrodes, passing through the material of the first and second ends, thereby fusing (sealing) the first and second ends together. In certain embodiments, when welding is utilized for sealing of the first and second ends, after the heat sealing is completed, an additional form of sealing (e.g., using an additional chemical compound over the sealed section of the first and second ends).

Stems

Finally, in order to form a usable inner tube, a stem must be attached so as to allow for air inflation (i.e., the stem penetrates one layer of the film material allowing for air to be inserted into the tube, thereby inflating it for use). In certain embodiments of the processes disclosed herein, the stem is operably attached to the contiguous tube (i.e., after sealing of the first and second ends). In other embodiments of the processes disclosed herein, the stem is operably attached prior to forming of the contiguous tube (i.e., before sealing of the first and second ends). Various particular methods for operably attaching a valve stem to an inner tube are known to those of skill in the art and may be applied to the methods of the embodiments disclosed herein. Non-limiting examples of methods for operably attaching a value stem are disclosed in U.S. Pat. Nos. 2,272,894; 2,143,837; 2,261,833 and 4,854,840, the entire disclosures of which are incorporated by reference herein.

Weight Savings

By utilizing for the inner tube a film material having an oxygen permeability of 8-15 $cm^3$ $O_2/m^2$·per day at 25° C., at a thickness of 100-400 microns, it is possible to reduce the weight of a given inner tube as compared to an inner tube of the same size, having the same (or less) air impermeability and made from conventional butyl or bromobutyl rubbers. As a non-limiting example, a sample of ExxonMobil Exxcore™ DVA having a thickness of 200 microns, an example of a suitable film material for use in preparing the light-weight inner tubes disclosed herein, was measured using a Mocon OXTRAN® Model 2/61 oxygen permeation test. The testing occurred at room temperature (i.e., about 25° C.). The oxygen permeability of the DVA film material was found to be 8 $cm^3$ $O_2/m^2$·day. While the DVA film material included an adhesive layer and the oxygen permeability was measured with the adhesive layer intact, the adhesive is not expected to contribute any appreciable impermeability to the overall DVA film material. As a comparison, a sample of conventional filled halobutyl rubber having a thickness of 500 microns was also measured using the same equipment and according to the same procedure. The oxygen permeability of the filled halobutyl rubber was found to be 20-24 $cm^3$ $O_2/m^2$·day. Thus, even though the sample of DVA film material had a thickness of only 40% (i.e., 60% less) of the filled halobutyl film material, it achieved an oxygen impermeability that was 2.5-3 times higher than the halobutyl film material. Taking into account that the specific gravity of the DVA material is about 1-1.1, the specific gravity of halobutyl rubber is about 0.92 and the specific gravity of filled halobutyl rubber (containing e.g., carbon black and other standard fillers and additives) is 1.00-1.06, the substitution of the above DVA film material for the filled halobutyl film material in an inner tube would result in a weight reduction of 55-60%. In certain embodiments disclosed herein, the phrase "light-weight inner tube" should be understood to mean an inner tube having a weight that is at least 25% lighter (e.g., 25-80%, 25-65%, 50-80%, 50-65%) than a comparative commercial inner tube of the same size, but made of a butyl rubber film material.

Conventional butyl rubber/halobutyl rubber inner tubes for large trucks vary widely in weight, but a common range for many is about 5-9 pounds (2.3-4 kg). Accordingly, substitution of the DVA film material discussed above in such inner tubes for the conventional film material (i.e., filled halobutyl rubber) would result in a weight savings of about 2.8-5.4 pounds per tire containing the DVA film material-based inner tube; such a weight savings would translate to an increase in fuel economy for a truck, especially considering that large trucks such as semis may travel 50,000-100,000 miles (or more) in a given year.

Without being limiting, it is contemplated that the light-weight inner tubes disclosed herein may be most useful for those inner tubes used in large truck, bus and agricultural tires. For example, large truck tires often have an inflated outer diameter of 38-45.8 inches (0.97-1.16 meters) and a circumference of the cross section of 31.0-37.5 (0.79-0.95 meters). By inflated outer diameter is meant the diameter from the top to the bottom of the inflated inner tube when the tube is standing up. By circumference of the cross section is meant the circumference of the cross sectional area of a circle-shaped slice of the inflated inner tube.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus, and illustrative examples shown and described. Accordingly, departures may be made from such details without departing from the spirit or scope of the applicant's general inventive concept.

What is claimed is:

1. A light-weight inner tube for use inside a pneumatic tire, the inner tube consisting:
    a film layer with a wall thickness of 251 to 400 microns; and
    a stem operably sealed to the inner tube to allow for air inflation of the inner tube;
    wherein the film layer is comprised of a film material comprising at least one thermoplastic engineering resin and optionally at least one saturated elastomer, and the film material of the film layer has an oxygen permeability of 8-15 $cm^3 O_2/m^2$·per day at 25° C., and
    wherein the light-weight inner tube has an inflated diameter of 38 to 46 inches.

2. The light-weight inner tube of claim 1, wherein the at least one thermoplastic engineering resin of the film tube is selected from the group consisting of polyamide resins, polyester resins, polynitrile resins, polymethyacrylate resins, polyvinyl resins, cellulose resins, fluororesins, imide resins, and combinations thereof.

3. The light-weight inner tube of claim 1, wherein, when present, the at least one saturated elastomer of the film tube is selected from the group consisting of hydrogenated diene rubbers, halogenated rubbers, butyl rubbers, silicone rubbers, sulfur-containing rubbers, fluoro-rubbers, hydrin rubbers, acryl rubbers, ionomers, ethylene propylene diene monomer rubbers, and combinations thereof.

4. The light-weight inner tube of claim 1, wherein the film material is selected from the group consisting of ethylene-vinyl alcohol copolymers, modified ethylene-vinyl alcohol copolymers, vinylidene chloride polymers, nylon-containing elastomers, dynamically vulcanized alloys, and combinations thereof.

5. The light-weight inner tube of claim 1, wherein the light-weight inner tube has a circumference of a cross section of 31 to 38 inches.

6. The light-weight inner tube of claim 5, wherein the film material of the film layer has an oxygen permeability of 8-10 $cm^3O_2/m^2$·per day at 25° C.

7. The light-weight inner tube of claim 1, wherein the film material of the film layer has an oxygen permeability of 8-10 $cm^3O_2/m^2$·per day at 25° C.

8. A pneumatic tire product comprising:
a tire;
a light-weight inner tube according to claim 1; and
a stem operably attached to the film tube; and
wherein the light-weight inner tube is located inside the tire.

9. The pneumatic tire product of claim 8, wherein the film material of the light-weight inner tube comprises a dynamically vulcanized alloy comprised of nylon and a brominated copolymer of an isolefin monomer and a styrene monomer.

10. A process for manufacturing a light-weight inner tube according to claim 1, the process comprising:
providing a tubular-shaped film material having a wall thickness of 251 to 400 microns and an oxygen permeability of 8-15 $cm^3O_2/m^2$·per day at 25° C.;
cutting the tubular-shaped film material, thereby forming a film tube segment having a first end and a second end;
sealing the first end of the film tube segment to the second end of the film tube segment thereby forming a contiguous tube; and
operably attaching a stem to the tubular-shaped film material either after cutting the tubular-shaped film material or after forming the contiguous tube, thereby allowing for inflation and forming of the inner tube.

11. The process of claim 10, wherein the tubular-shaped film material has been extruded by blowing.

12. The process of claim 10, wherein the at least one thermoplastic engineering resin of the tubular-shaped film material is selected from the group consisting of polyamide resins, polyester resins, polynitrile resins, polymethyacrylate resins, polyvinyl resins, cellulose resins, fluororesins, imide resins, and combinations thereof, and when present, the at least one saturated elastomer is selected from the group consisting of hydrogenated diene rubbers, halogenated rubbers, butyl rubbers, silicone rubbers, sulfur-containing rubbers, fluoro- rubbers, hydrin rubbers, acryl rubbers, ionomers, ethylene propylene diene monomer rubbers, and combinations thereof; and/or the tubular-shaped film material is comprised of at least one material selected from the group consisting of ethylene-vinyl alcohol copolymers, modified ethylene-vinyl alcohol copolymers, vinylidene chloride polymers, nylon-containing elastomers, dynamically vulcanized alloys, and combinations thereof.

13. The process of claim 10, wherein the sealing comprises heat sealing.

14. The process of claim 10, wherein the sealing comprises high frequency welding.

15. The process of claim 10, wherein the light-weight inner tube has a circumference of a cross section of 31 to 38 inches.

16. The process of claim 10, wherein the film material of the film layer has an oxygen permeability of 8-10 $cm^3O_2/m^2$·per day at 25° C.

17. A light-weight inner tube suitable for use inside a pneumatic tire, the inner tube consisting of:
a film layer with a wall thickness of 251 to 400 microns;
an adhesive layer having a thickness of 10-50 microns;
an innermost partitioning sheet layer made from a material selected from the group consisting of polyethylene, polypropylene, polybutene, and combinations thereof; and
a stem operably sealed to the inner tube to allow for air inflation of the inner tube;
wherein the film layer is comprised of a film material comprising at least one thermoplastic engineering resin and no saturated elastomer, and the film material of the film layer has an oxygen permeability of 8-15 $cm^3O_2/m^2$·per day at 25° C., and
wherein the film layer is the outer-most layer of the light-weight inner tube and the light-weight inner tube forms a continuous tube and has an inflated outer diameter of 38 to 46 inches.

18. The light-weight inner tube of claim 17, wherein
the at least one thermoplastic engineering resin of the film layer is selected from the group consisting of polyamide resins, polyester resins, polynitrile resins, polymethyacrylate resins, polyvinyl resins, cellulose resins, fluororesins, imide resins, and combinations thereof; and
the film material is selected from the group consisting of ethylene-vinyl alcohol copolymers, modified ethylene-vinyl alcohol copolymers, vinylidene chloride polymers, nylon-containing elastomers, dynamically vulcanized alloys, and combinations thereof.

19. A pneumatic tire product comprising:
a. a tire;
b. the light-weight inner tube of claim 17,
wherein the light-weight inner tube is located inside the tire.

* * * * *